United States Patent [19]
Balentine, Jr.

[11] 3,932,260
[45] Jan. 13, 1976

[54] HEAT SPLICING APPARATUS

[76] Inventor: George H. Balentine, Jr., State Park Road, Greenville, S.C. 29609

[22] Filed: July 24, 1974

[21] Appl. No.: 491,403

[52] U.S. Cl. .............. 156/583; 156/290; 156/502
[51] Int. Cl.² .................................. B30B 15/34
[58] Field of Search .......... 156/306, 309, 157, 581, 156/583, 502, 290; 93/DIG. 1; 53/39

[56] References Cited
UNITED STATES PATENTS

| | | | |
|---|---|---|---|
| 1,628,203 | 5/1927 | Stein | 156/581 |
| 2,130,188 | 9/1938 | Kauffman et al. | 101/31 |
| 2,768,272 | 10/1956 | Lesher | 219/228 |
| 2,815,620 | 12/1957 | Prodigo | 93/DIG. 1 |
| 3,258,385 | 6/1966 | Lake | 156/290 |
| 3,767,512 | 10/1973 | Tsuda | 156/581 |

Primary Examiner—William A. Powell
Assistant Examiner—Brian J. Leitten
Attorney, Agent, or Firm—Bailey & Dority

[57] ABSTRACT

An apparatus for splicing lengths of textile fabric and the like in end to end relation by the application heat to a heat fusible bonding material is illustrated wherein one of a pair of movable jaws has a face presenting a herringbone configuration with alternate ridges and depressions extending diagonally across the jaw to produce a splice presenting substantially uniform resistance to longitudinal force exerted on the fabric but which permits lateral stretching of the splice.

1 Claim, 1 Drawing Figure

HEAT SPLICING APPARATUS

BACKGROUND OF THE INVENTION

Splicing of textile fabric as it comes from the loom take up roll connecting that roll of fabric to another length of cloth coming from another loom is necessary to carry out the finishing process. For example, on tenter frames, cloth is run in continuous length in open width. Sometimes this splicing is carried out by sewing and sometimes by a heat splicing machine such as illustrated in U.S. Pat. No. 3,000,434. In both cases the splice presents resistance to lateral stretching of the fabric resulting in damage thereto as a result of the selvage stretching mechanism being incapable of stretching the length of fabric laterally at the splice. In the case of the patented machine, it will be noted that the jaws continuously fuse one layer of the fabric to the other entirely thereacross and since the splice is a heat bonded joint, such is not yieldable to lateral force exerted thereon such as those which tend to maintain the cloth in uniform open width as on a tenter frame. It is important, however, that the splice extend across the entire width of the fabric between the lengths of fabric so as to present a substantially uniform resistance to longitudinal force tending to pull the fabric through the tenter frame or other finishing equipment.

Accordingly, it is an important object of this invention to provide a splice utilizing apparatus similar to that disclosed in the aforesaid patent as modified herein.

Another important object of the invention is to provide a novel splicing device wherein a pair of jaws apply heat across the fabric to bond two layers together through the use of heat fusible material therebetween.

The heat fusible material may be in the form of a heat fusible strip inserted between the thicknesses of fabric or it may be the fabric itself which will fuse upon application of heat together sufficiently to afford the necessary splice for subsequent finishing operations. In addition to textile material, any sheet material which is processed in open width may be joined to another length thereof through a modification of the process wherein a suitable heat fusible material is employed in creating the splicing.

SUMMARY OF THE INVENTION

It has been found that a splicing machine for joining lengths of material in open width such as textile fabric may be provided for applying heat to the splice area through the application of heating by jaws, at least one of which presents a herringbone configuration so that discreet bonded areas form the splice, such bonded areas preferably extend across the fabric converging toward the middle.

BRIEF DESCRIPTION OF THE DRAWING

The construction designed to carry out the invention will be hereinafter described together with other features thereof.

The invention will be more readily understood from a reading of the following specification and by reference to the accompanying drawing forming a part thereof, wherein an example of the invention is shown and wherein.

DESCRIPTION OF A PREFERRED EMBODIMENT

Figure 1:
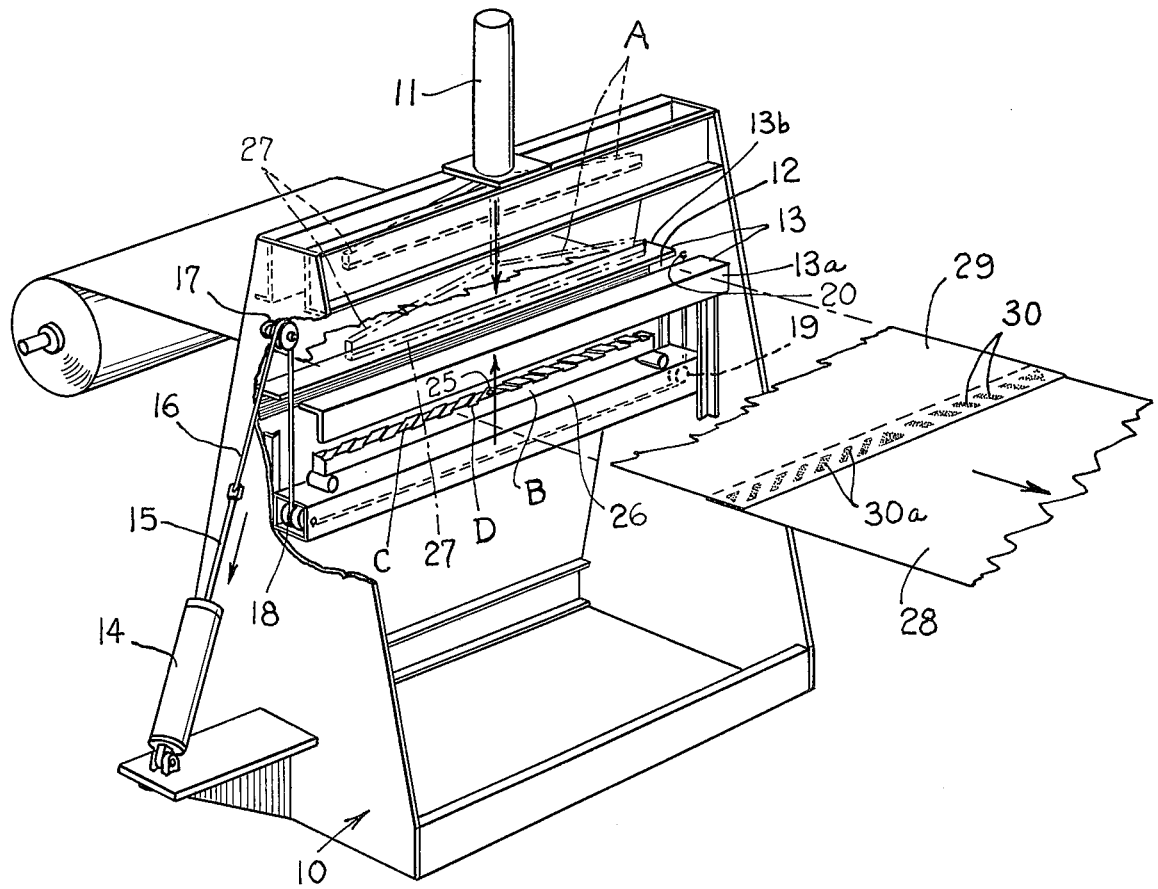
FIG. 1 is a perspective view of a splicing apparatus constructed in accordance with the present invention with fabric illustrated as passing therethrough for being spliced.

The drawing illustrates an apparatus for splicing lengths of textile fabric in end to end relation by application of heat to heat fusible bonding material at overlapping end portions of the lengths of fabric. The apparatus includes a narrow elongated first jaw A and a complementary second jaw B. At least one of the jaws is heated and each jaw is movable toward and away from the other for such application of heat. A face on one of the jaws is of a substantially herringbone configuration having alternate ridges C with depressions D therebetween extending along the jaw. Such ridges and depressions extend diagonally across the jaw. Thus, a splice formed between the jaws offers substantially uniform resistance to longitudinal forces exerted on the fabric but permits lateral stretching of the splice. It will be noted that the ridges and depressions on one side of the face converge toward the ridges and depressions on the other side of said face at a medial portion thereof.

It will be observed that the apparatus illustrated conforms generally to that shown in U.S. Pat. No. 3,000,434 which is incorporated herein by reference. The face of at least one of the jaws, however, is modified to present a herringbone configuration presenting a splice joint which is capable of stretching laterally to accommodate finishing steps to be carried out upon the fabric and the like. The apparatus includes a substantially vertical frame broadly designated at 10. Suitable mechanism is illustrated at 11 for lowering the jaw A into engagement with jaw B as the latter is raised to meet within the slotted area 12 between the splicing table 13 formed by the opposed angle irons 13a and 13b. Suitable mechanism for raising the jaw B includes a fluid operated mechanism having a cylinder 14 and a pistion rod 15 extending therefrom. The piston rod is connected to one end of a flexible cable 16 which, in turn, passes a pulley 17 and turns downwardly over pulleys 18 and 19 and being fixedly connected to the frame as at 20.

Figure 2:
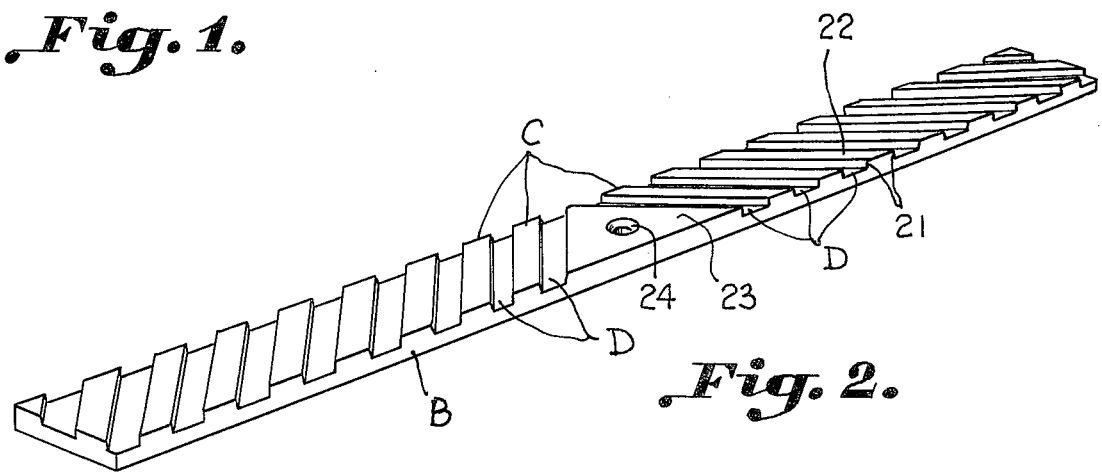
FIG. 2 is an enlarged, perspective view of a face plate for one of the jaws of the device illustrated in FIG. 1.

The alternate ridges C are best illustrated in FIG. 2 and on each side of the face member they extend toward a central portion of the fabric passing therethrough. The spaced ridges each have vertical sides 21 and a horizontal flat top portion 22. A substantially triangularly shaped central ridge will be noted at 23, the sides of which converge as aforesaid. An aperture 24 extends vertically downwardly through the central portion 23 and a suitable screw 25 is provided for holding the face plate on the base portion 26. It should be observed at this point that a flat heater band 27 may be provided as an upper face plate 27. If desired, heating means may be provided for heating the lower face plate B. The face plate B may have additional fastening means such as a thermosetting plastic material for securing the plate to the base 26.

Referring more particularly to FIG. 1, a cloth is illustrated as passing through the apparatus over the surface of the splicing table 13 which is cool in order to permit the splice to be set up. The trailing end of one length of fabric 28 has been joined to the beginning end of another piece of fabric 29. Preferably the fabric carries with it a heat fusible impregnant or other suitable material which sets spaced discreet areas corresponding to the high points of the herringbone splicing plate as illustrated at 30. The unbonded areas 30a corresponding to the depressions in the face plate are unbonded and permit lateral stretching. Since the splice area 30 extends substantially across the entire width of the fabric, since the ridges C overlap as illustrated, a substantially uniform resistance to longitudinal force is afforded thereby.

While a preferred embodiment of the invention has been described using specific terms, such description is for illustrative purposes only, and it is to be understood that changes and variations may be made without departing from the spirit or scope of the following claims.

What is claimed is:

1. For use in an apparatus for splicing lengths of textile fabric in end to end relation by application of heat to heat fusible bonding material at overlapping end portions of said lengths of fabric, having a narrow elongated first jaw and a complementary second jaw, at least one of said jaws being heated, each being movable toward and away from the other for such application of heat, the improvement including:
    a series of alternate ridges and depressions extending along a face of one of said jaws forming a substantially herringbone configuration thereacross; and
    said ridges and depressions on one side of said face converge toward said ridges and depressions on the other side of said face at a medial portion thereof;
    whereby a splice formed between said jaws across said fabric offers a uniform resistance to longitudinal forces exerted on said fabric but which permits lateral stretching of the splice.

* * * * *